United States Patent
Tamura et al.

(10) Patent No.: US 10,823,984 B2
(45) Date of Patent: Nov. 3, 2020

(54) POLARIZING LENS FOR SPECTACLES

(71) Applicant: TALEX OPTICAL CO., LTD., Osaka (JP)

(72) Inventors: Hiroo Tamura, Osaka (JP); Shoichi Mitsuuchi, Osaka (JP); Kenzo Wada, Osaka (JP); Ryogo Nitta, Osaka (JP)

(73) Assignee: TALEX OPTICAL CO., LTD., Osaka (JP)

( * ) Notice: Subject to any disclaimer, the term of this patent is extended or adjusted under 35 U.S.C. 154(b) by 238 days.

(21) Appl. No.: 16/070,696

(22) PCT Filed: Jun. 17, 2016

(86) PCT No.: PCT/JP2016/068079
§ 371 (c)(1),
(2) Date: Jul. 17, 2018

(87) PCT Pub. No.: WO2017/126138
PCT Pub. Date: Jul. 27, 2017

(65) Prior Publication Data
US 2019/0004337 A1    Jan. 3, 2019

(30) Foreign Application Priority Data
Jan. 22, 2016 (JP) .................. 2016-010521

(51) Int. Cl.
*G02C 7/12* (2006.01)
*G02C 7/10* (2006.01)
(Continued)

(52) U.S. Cl.
CPC .............. *G02C 7/12* (2013.01); *G02B 1/041* (2013.01); *G02B 5/22* (2013.01); *G02B 5/30* (2013.01); *G02C 7/108* (2013.01)

(58) Field of Classification Search
CPC ........ G02C 7/12; G02C 2202/16; G02C 7/10; G02C 7/101; G02C 7/104; G02C 11/10;
(Continued)

(56) References Cited

U.S. PATENT DOCUMENTS 4,152,332 A     5/1979   Bloom
5,926,310 A *  7/1999   Tamura ............... G02B 5/3033
                                                         351/159.62
(Continued)

FOREIGN PATENT DOCUMENTS

EP    2 618 206    7/2013
JP    3357803      12/2002
(Continued)

OTHER PUBLICATIONS

International Preliminary Report on Patentability dated Jul. 24, 2018 in International (PCT) Application No. PCT/JP2016/068079.
(Continued)

*Primary Examiner* — William R Alexander
*Assistant Examiner* — Sharrief I Broome
(74) *Attorney, Agent, or Firm* — Wenderoth, Lind & Ponack, L.L.P.

(57) ABSTRACT

A polarizing element is superposed upon a lens base material. The polarizing element has an average light transmittance of light having a wavelength of 400 to 760 nm in a visible region is 30% or more. A light transmittance of light having a wavelength of 410 to 700 nm in a near infrared region is 0 to 2% when the polarizing element and an identical polarizing element are superposed one upon the other with their polarization axes perpendicular to each other. One of a film integral with the polarizing lens and the lens base material contains a near infrared ray absorption dye such that a light transmittance of light having a wavelength of 700 to 800 nm in a near infrared region is 0 to 2%
(Continued)

when the polarizing lens and an identical polarizing lens are superposed one upon the other with their polarization axes perpendicular to each other.

4 Claims, 2 Drawing Sheets

(51) Int. Cl.
*G02B 5/30* (2006.01)
*G02B 5/22* (2006.01)
*G02B 1/04* (2006.01)

(58) Field of Classification Search
CPC ........ G02C 5/001; G02C 7/105; G02C 7/108; G02C 11/08; G02C 9/02; G02C 2200/12; G02C 2200/18; G02C 2200/22; G02C 3/02; G02C 5/14; G02C 5/146; G02C 5/16; G02C 5/22; G02C 5/2254; G02B 5/3033; G02B 1/041; G02B 30/34; G02B 5/305; G02B 30/25; G02B 1/08; G02B 5/3058; G02B 5/3083; G02B 27/017; G02B 5/223; G02B 5/23; G02B 1/14; G02B 2027/014; G02B 2027/0178; G02B 27/0172; G02B 27/286; G02B 30/24; G02B 1/105; G02B 1/11; G02B 1/18; B29C 66/71; B29C 51/14; B29C 43/021; B29C 43/203; B29C 66/81455; B29C 2045/14237; B29C 45/14811; B29C 65/00; B29C 2043/3615; B29C 2043/3644; B29C 2043/563; B29C 2791/006; B29C 33/405; B29C 33/42; B29C 45/14; B29C 45/7207; B29C 51/428; B29C 61/00; B29C 63/16; B29C 65/10; B29D 11/0073; B29D 11/00644; B29D 11/00634; B29D 11/00009; B29D 11/00413; B29D 11/00528; B29D 11/00903; H04N 13/337; H04N 2213/008; H04N 13/341; H04N 13/144; H04N 13/261; H04N 13/324; H04N 13/327; H04N 13/332; H04N 13/334; H04N 13/359; H04N 13/398; H04N 2013/0077; H04N 2013/0096; H04N 2213/002; B32B 2307/42; B32B 2551/00; B32B 27/08; B32B 27/306; B32B 17/10036; B32B 17/10458; B32B 17/10651; B32B 17/10706; B32B 2307/558; B32B 27/365; B32B 1/00; B32B 2250/03; B32B 2250/24; B32B 2307/4026; B32B 2307/412; B32B 2307/704; B32B 2307/738; B32B 27/20; B32B 27/34; B32B 37/02
See application file for complete search history.

(56) References Cited

U.S. PATENT DOCUMENTS

| | | |
|---|---|---|
| 8,210,678 B1 | 7/2012 | Farwig |
| 2003/0179459 A1 | 9/2003 | Hayashi |
| 2010/0118263 A1 | 5/2010 | Tamura et al. |
| 2011/0043902 A1 | 2/2011 | Ishibashi et al. |
| 2013/0155507 A1 | 6/2013 | Ryu et al. |
| 2014/0320985 A1* | 10/2014 | Matsumoto .............. G02C 7/12 359/722 |
| 2015/0276986 A1* | 10/2015 | Ryu ................. B29D 11/00644 359/488.01 |

FOREIGN PATENT DOCUMENTS

| | | |
|---|---|---|
| JP | 2003-279905 | 10/2003 |
| JP | 2010-85911 | 4/2010 |
| JP | 2011-39447 | 2/2011 |
| JP | 2015-180942 | 10/2015 |
| WO | 2008/133008 | 11/2008 |
| WO | 2013/054656 | 4/2013 |

OTHER PUBLICATIONS

Supplemental translation of paragraph 0063 in Machine Translation JP 2010-85911A.
Extended European Search Report dated Dec. 19, 2018 in corresponding European Patent Application No. 15886378.5.

* cited by examiner

POLARIZING LENS FOR SPECTACLES

TECHNICAL FIELD

This invention relates to a polarizing lens for spectacles provided with a polarizing film.

BACKGROUND ART

In general, spectacles using a polarizing lens are used to protect eyes from glare in an environment, such as seas and mountains, having a high illuminance and a large quantity of reflected light so as to mitigate fatigue and enhance visibility, and are often employed for fishing and fish breeding operations in seas and inland waters and outdoor sports, such as golf, skiing, and driving, in which reflected light is provided from, for example, a water surface, a turf, a snow surface, and a road surface, and operations in a room, such as a printing facility, under a high illuminance environment.

In a polarizing element used for the polarizing lens, a thin film, such as polyvinyl alcohol, is stretched at a ratio of about three to five times and a dichroic pigment consisting of iodine or a dichroic dye is adsorbed to orient a crystal structure and molecules, and an appearance is grayish brown or grayish green in color.

Consequently, polarized spectacles are in a state in which a transmittance of visible light is restricted during usage, and erroneous recognition of a color of an actual object may occur.

In order that such erroneous recognition does not occur and a stable glare proof property over the entirety of a wavelength range of visible light is obtained, there has been known a polarizing element in which a light transmittance in a wavelength of 410 to 700 nm in a near infrared region is 0 to 2% while two polarizing elements are superposed one upon the other and polarization axes are perpendicular to each other, or there have been known glare proof polarized spectacles which are color-adjusted using a grey-like dye so that a light transmittance in a wavelength of 430 to 750 nm in a near infrared region is 2% or less while two polarizing lenses are superposed one upon the other and polarization axes are perpendicular to each other (Patent Document 1 mentioned below).

Further, in the polarized spectacles, with respect to light rays having a wavelength in a visible boundary region, light polarization is insufficient and transmission may occur, and for example, a phenomenon called "red leakage" which occurs when sunlight hits a wave crest of a water surface at a certain angle is a phenomenon likely to occur in a polarizing lens manufactured using a thermoplastic resin, such as polycarbonate, acrylate, and acetate and by an injection process in which light in a red color region is allowed to be transmitted.

To describe a cause thereof in detail, it can be considered that because a polarizing film is exposed to a molten resin having a high temperature when a spectacle lens made of a resin is molded, a measure to selectively use such a polarizing dye as to be capable of resisting high temperature is taken, while, nevertheless, properties of the dye are changed more or less and light in a red color region having a long wavelength can be no longer cut off.

In addition, a phenomenon called "blue leakage" is a phenomenon which occurs in a polarizing lens manufactured using an allyl diglycol carbonate resin (commonly referred to as "CR39"), a thermosetting resin, such as urethane, and a glass and by a bonding or fusion process, and is a phenomenon which occurs due to a cause different from that of the "red leakage" as described above, in which a blue color of iodine is transparently seen in a blue color region which has a short wavelength in a case of a lens with a low dyeing degree of iodine used for a polarizing dye and having a high polarization degree.

As a common measure to prevent the "blue leakage" as described above, there has been known a method of decreasing a light transmittance in a blue color region as much as possible to avoid the same by densely dyeing a polarizing film or decreasing a concentration of iodine while increasing a ratio of other dyes.

PRIOR ART REFERENCES

Patent Documents

Patent Document 1: Japanese Patent No. 3357803 B2

DISCLOSURE OF THE INVENTION

Problems to be Solved by the Invention

However, in a conventional polarizing lens, there has been a problem that light in a red color region can be no longer cut off and the so-called "red leakage" phenomenon occurs even when the polarizing lens provides a clear and easy vision similarly to a case of naked-eye vision, is color-adjusted so that an average transmittance of visible light in a wavelength range of 400 to 760 nm is 30% or more, and is color-adjusted to have a grey-like color so that an actual color of an object can be sensed.

In particular, in a polarizing lens using a polarizing dye of iodine, when an average transmittance of visible light is configured to be 30% or more, a color of iodine becomes to be transparently seen in exchange for a clear and easy vision and an inconvenient phenomenon of the "blue leakage" may occur as well.

In such a case, there occurs also a problem that when a light transmittance in a blue color region is decreased by densely dyeing the polarizing film so as to prevent the "blue leakage" by the method as described above, a spectral transmittance (visual transmittance) decreases, and when a concentration of iodine is decreased and a ratio of other dyes is increased, a polarization degree decreases.

Herein, light which is still transmitted while two polarizing films are superposed one upon the other and polarization axes are configured to be perpendicular to each other, i.e. in a so-called crossed Nicols state, is light which transmits a dye itself without being polarized by the dye used for the polarizing films. Thus, such transmitted light is an obstacle to sufficiently exhibit performances of polarized spectacles, and it has been necessary that particularly light having a specific wavelength which is a cause of a "color leakage phenomenon" that is also referred to as "red leakage" or "blue leakage" is cut off.

Then, to solve the above problems, it is an object of this invention to provide a polarizing lens for spectacles which is a clear polarizing lens having a large transmitted light amount using a polarizing film that is color-adjusted using iodine and the like so that an average transmittance of visible light in a wavelength range of 400 to 760 nm is configured to be 30% or more while light in a wavelength of 700 to 800 nm is cut off and no phenomenon of the "red leakage" occurs, and further, light in a wavelength of 400 to 500 nm is also cut off and a phenomenon of the "blue leakage" can be also prevented.

Means for Solving the Problems

To solve the above problems, in this invention, there is provided a polarizing lens for spectacles comprising a lens base material, and a polarizing element superposed upon the lens base material, wherein the polarizing element has an average light transmittance of light having a wavelength of 400 to 760 nm in a visible region, the average light transmittance being 30% or more, wherein a light transmittance of light having a wavelength of 410 to 700 nm in a near infrared region is 0 to 2% when the polarizing element and an identical polarizing element are superposed one upon the other with polarization axes thereof perpendicular to each other, and wherein one of a film integral with the polarizing lens and the lens base material contains a near infrared ray absorption dye such that a light transmittance of light having a wavelength of 700 to 800 nm in a near infrared region is 0 to 2% when the polarizing lens and an identical polarizing lens are superposed one upon the other with polarization axes thereof perpendicular to each other.

The polarizing lens for spectacles of this invention configured as described above is a polarizing lens for spectacles which includes the polarizing element having an average light transmittance of light having a wavelength of 400 to 760 nm in a visible region, which average light transmittance is 30% or more and provides a clear vision, and the film provided to the lens base material or a surface thereof contains a required amount of a near infrared ray absorption dye such that a light transmittance of light having a wavelength of 700 to 800 nm in a near infrared region is 0 to 2% if two of the polarizing lenses are superposed one upon the other with polarization axes perpendicular to each other.

Thus, a light transmittance of light having a wavelength of 700 to 800 nm in a near infrared region is adjusted to be a very small amount of substantially 0% or 2% or less if two of the polarizing lenses are superposed one upon the other with polarization axes thereof perpendicular to each other, whereby the polarizing lens made of a resin providing a clear vision wherein the transmitted light amount in the visible light region is 30% or more can sufficiently cut off light in a prescribed red color region and reliably prevent a "red leakage" phenomenon.

Further, in a case in which the polarizing element as described above is an iodine-containing polarizing element using only iodine as a dichroic pigment, even when the polarizing lens is color-adjusted to have a grey-like color so that an actual color of an object can be sensed, and is color-adjusted so that an average transmittance of visible light having a wavelength range of 400 to 760 nm is adjusted to be 30% or more, light in the red color region having a long wavelength can be cut off and a "red leakage" phenomenon can be reliably prevented.

The polarizing lens configured as described above which contains a blue light absorber having a maximum absorption wavelength of 440 to 460 nm such that a light transmittance of light having a wavelength of 400 to 500 nm in a blue light region is 0 to 2% if two of the polarizing lenses are superposed one upon the other with polarization axes thereof perpendicular to each other is a polarizing lens made of a resin which provides a clear vision wherein the transmitted light amount in a visible light region is 30% or more, and is capable of not only prevents a "red leakage" phenomenon but also preventing a phenomenon of the "blue leakage" while a spectral transmittance (visual transmittance) and a polarization degree are not decreased as described above.

The lens base material used for such a polarizing lens for spectacles can be employed from that made of a resin for cast molding selected from an allyl diglycol carbonate resin, a urethane resin, a thiourethane resin, and an acrylic resin, or there may be employed a resin in which the other thermoplastic resin is used and injection molding at a high temperature is performed to manufacture the polarizing lens. Further, the polarizing lens for spectacles using a thermosetting resin, such as urethane, may be employed, and even when properties of a polarizing dye is changed more or less through heating required during such a lens manufacturing process, a near infrared ray absorption agent is used, thereby providing the polarizing lens for spectacles which can reliably prevent a "red leakage" phenomenon.

In glare proof polarized spectacles in which a light transmittance of light having a wavelength of 430 to 750 nm is 2% or less if two of the polarizing lenses are superposed one upon the other with polarization axes thereof perpendicular to each other, the glare proof polarized spectacles being color-adjusted using a grey-like dye, the polarizing lens for spectacles as described above enables determination of an original color without erroneous recognition, provides a glare proof property without a glare due to reflected light, and is particularly capable of cutting off light having a specific wavelength of a color leakage phenomenon that is referred to as "red leakage" or "blue leakage".

Figure 4:
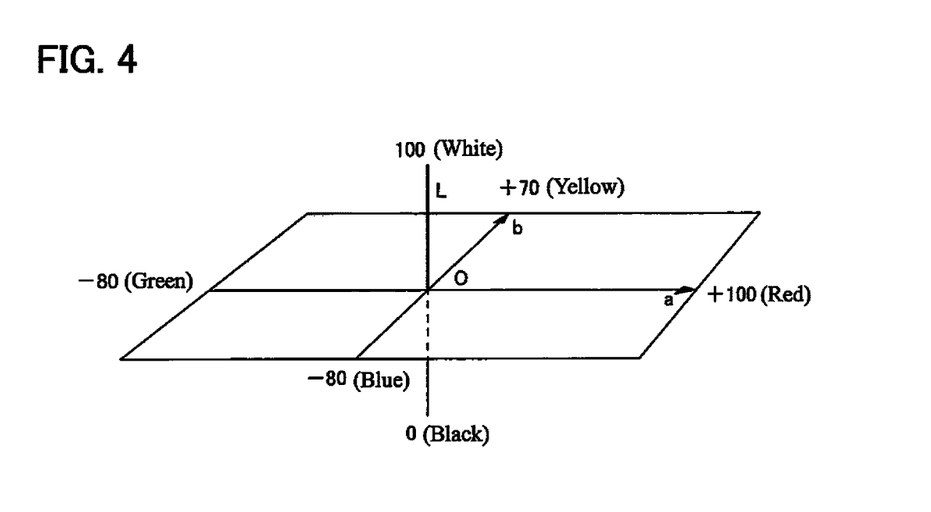
FIG. 4 is an explanatory diagram of a color solid of a UCS color space.

Note that the above grey-like color includes a grey-like color in which color coordinate values L, a, and b in a UCS color space as illustrated in FIG. 4 are expressed by $22 \leq L \leq 70$, $-2.0 \leq a \leq 2.0$, and $-2.0 \leq b \leq 2.0$, respectively.

Effect of the Invention

In this invention, one of the film integral with the polarizing lens and the lens base material contains a near infrared ray absorption dye such that a light transmittance of light having a predetermined wavelength range in a near infrared region is substantially 0% (0 to 2%) if two of the polarizing lenses are superposed one upon the other with polarization axes thereof perpendicular to each other, i.e. in a so-called crossed Nicols state, thereby exhibiting an advantage that the polarizing lens made of a resin providing a clear vision wherein the transmitted light amount in the visible light region is 30% or more can reliably prevent a "red leakage" phenomenon of the polarizing lens using the polarizing film which is color-adjusted using iodine and the like.

Further, there is contained a blue light absorber such that a light transmittance of light having a wavelength of 400 to 500 nm in a blue light region is substantially 0% (0 to 2%) in a so-called "crossed-Nicols" state, which exhibits an advantage that not only a "red leakage" phenomenon can be prevented, but also a phenomenon of the "blue leakage" can be prevented while a spectral transmittance (visual transmittance) and a polarization degree are not decreased.

DETAILED DESCRIPTION OF THE INVENTION

A polarizing lens for spectacles according to an embodiment of this invention is a polarizing lens including a polarizing element superposed upon a lens base material, in which the polarizing element has an average light transmittance of light having a wavelength of 400 to 760 nm in a visible region, the average light transmittance being 30% or more, a light transmittance of light having a wavelength of 410 to 700 nm in a near infrared region is 0 to 2% if two of the polarizing elements are superposed one upon the other with polarization axes thereof perpendicular to each other, and one of a film integral with the polarizing lens and the lens base material contains a near infrared ray absorption dye such that a light transmittance of light having a wavelength of 700 to 800 nm in a near infrared region is 0 to 2% if two of the polarizing lenses are superposed one upon the other with polarization axes thereof perpendicular to each other.

The lens base material used in this invention may not be particularly limited and for example, there can be cited a thermoplastic resin, such as polycarbonate, methyl methacrylate (MMA), polyester, and polyolefin. Further, as a thermosetting resin, there can be cited polyurethane, thiourethane, diethylene glycol bis allyl carbonate, ethylene glycol diacrylate, methacrylate, an acryl styrene urethane copolymer, and the like.

In particular, as the lens base material of this invention, as a type of a resin preferred in terms of transparency, cast molding property, mechanical strength, and processability, there can be cited a resin for cast molding selected from an allyl diglycol carbonate resin, a urethane resin, a thiourethane resin, and an acrylic resin Further, as the allyl diglycol carbonate resin, a diethylene glycol bis allyl carbonate is typical and a resin lens material (CR39) manufactured by PPG Co., Ltd can be used.

As a typical polymerization process, in a cast polymerization process, a resin raw material composition consisting of a resin lens material (monomer), a polymerization initiator or a curing agent, an organic dye, and other necessary additives is injected into two glass or metal molds which are arranged using a gasket or a tape to manufacture a spectacle lens, thereafter polymerized and cured under a predetermined polymerization condition, and then separated from the glass or metal molds so that a cured plastic lens material can be obtained.

In polymerization and curing, a molding for lens cast is heated at a temperature of about 20 to 100° C. for 1 to 48 hours while the temperature is adjusted in accordance with a composition of a resin raw material, a catalyst, a shape of the mold, and the like in an oven, water, or the like to accelerate a polymerization curing reaction.

The polarizing element can be manufactured using a stretchable film material which serves as a polarizing film, specifically by arranging a dichroic pigment by allowing a dichroic pigment to be adsorbed before or after a polyvinyl alcohol film (commonly referred to as vinylon film), a polyvinyl chloride film, a polyethylene terephthalate film or the like is stretched.

As the dichroic pigment, iodine or a dichroic dye can be cited, and a polarizing plate using iodine is called an iodine-containing polarizing plate, while a polarizing plate using a dichroic dye is called a dye-containing polarizing plate. As the dichroic dye, there can be used a known direct dye, reactive dye, acid dye, and the like.

A thickness and a degree of stretching of the film as unstretched for arranging the dichroic pigment are not conditions particularly limited, but a film having a thickness of 75 μm as uniaxially stretched at a ratio of about three to five times has a good polarizing property. If the film is stretched and then subjected to heating treatment by adding, as appropriate, boric acid, borax, or the like, an arrangement state becomes stable.

As the polarizing element, to manufacture a polarizing complex in which the polarizing film and a sheet are superposed one upon the other, one or more components selected from a light-transmitting sheet and an adhesive which are constituting members other than the polarizing film can be dyed in advance.

To prepare the polarizing element in which the average light transmittance of light having a wavelength of 400 to 760 nm in a visible region is 30% or more, preparation may be made by adjusting an adsorption concentration with respect to a stretch film of the dichroic pigment, and for example, one having an average light transmittance of 30% can be manufactured under a condition of an iodine solution having a concentration of 1% by mass, at a dyeing temperature of 40° C., and a stretch ratio of three times. Further, to prepare the polarizing element having an average light transmittance of 30% or more, it is suitable to perform preparation using an iodine solution having an iodine concentration of 1% or less by mass under a condition at a dyeing temperature of 40 to 60° C. to aim at a stretch ratio of three to six times.

To manufacture the polarizing lens using such a polarizing element, it is also possible that the polarizing film is sandwiched between two lenses using an adhesive to be bonded or the polarizing element is in advance positioned and inserted in an injection molding mold and a thermoplastic resin is injection-molded to perform composite integral molding so that the polarizing lens is manufactured.

In the polarizing lens for spectacles to be obtained, the lens base material or the film provided on a surface of the polarizing lens composed of one or more lens base materials is compounded with the near infrared ray absorption dye so that a light transmittance in a wavelength of 700 to 800 nm in a near infrared region does not exceed 2% while the two polarizing lenses for spectacles are superposed one upon the other and polarization axes are perpendicular to each other, i.e. in a so-called crossed Nicols state.

As the near infrared ray absorption dye, there can be cited a commercially available or known compound of a cyanine compound, a phthalocyanine compound, a dithiol metal complex, a naphthoquinone compound, a diimmonium compound, an azo compound, and the like.

In particular, as that having a high light absorption coefficient and a good solubility to an organic solvent, a cyanine compound and a phthalocyanine compound are preferable. Further, as apparent from the examples described later, among therefrom, particularly, commercially available near infrared ray absorption dyes having a maximum absorption wavelength of 700 to 850 nm were used to obtain good results.

Specifically, there can be cited a naphthalocyanine (manufactured by Yamada Chemical Co., Ltd.: FDN-001, maximum absorption wavelength of 754 nm, thermal decomposition temperature of 400° C.), a naphthalocyanine (manufactured by Yamada Chemical Co., Ltd.: FDN-002, maximum absorption wavelength of 807 nm, thermal decomposition temperature of 300° C.), a phthalocyanine compound (manufactured by Yamamoto Chemicals Inc.: YKR-2016, maximum absorption wavelength of 770 to 780 nm), a phthalocyanine compound (manufactured by Yamamoto Chemicals Inc: YKR-2900, maximum absorption wavelength of 780 to 790 nm), and the like.

Such a near infrared ray absorption dye is compounded to the resin raw material of the lens base material for spectacles to be formed, thereby being capable being uniformly contained in the lens base material for spectacles, or it is possible that when, in the polarizing lens for spectacles, a plurality of lens base materials for spectacles are integrally superposed one upon the other, a resin layer having the same material as the lens base material as separately provided contains the near infrared ray absorption dye and this resin layer is interposed between the plurality of lens base materials for spectacles to be integrated, or it is possible that a film made of a resin having a material similar to that of the resin layer coating a surface of the polarizing lens for spectacles contains the near infrared ray absorption dye to be integrally provided to the polarizing lens for spectacles.

Further, a blue light absorber having a maximum absorption wavelength of 450 to 550 nm is compounded to the lens base material such that a light transmittance of light having a wavelength of 400 to 500 nm in a blue light region is 0 to 2% if two of the spectacle lenses are in a "crossed Nicols" state.

As the blue light absorber used in this invention, that in which an ultraviolet ray absorber is compounded with a yellow-like or orange-like dye can be employed, a maximum absorption wavelength is adjusted to 450 to 550 nm, and as a commercially available wavelength selection dye, for example, there can be used those which are commonly referred to as blue cut dye and manufactured by Yamamoto Chemicals Inc.: SD-1022S2 and manufactured by Yamada Chemical Co., Ltd.: DAA95 and the like.

Note that as the known ultraviolet ray absorber, there can be cited benzophenones (2-oxy benzophenone derivatives), triazole derivatives, acrylonitrile derivatives, and the like, and particularly, as specific examples of the benzophenones, there can be cited 2-hydroxy-4-n-octoxy benzophenone, 4-dodecyloxy-2-hydroxybenzophenone, 2-2'-hydroxy-4-methoxybenzophenone, and the like.

A compound ratio of such a blue light absorption dye with respect to 100 parts by mass of the resin of the lens base material is preferably 0.002 to 0.02 parts by mass.

Further, such a blue light absorber can be also compounded to the lens base material or contained in the film provided on the surface of the polarizing lens composed of one or more lens base materials.

The surface of the polarizing lens may be also provided with a known coating superposed upon such a film, and for example, it is preferable to provide a hard coating, multiple coating, a fog proof coating, a drip proof coating, a UV coating, an IR coating, a split coating, a half dyeing, or a layer as subjected to reflection proof treatment, chemical resistance treatment, antistatic treatment, mirroring treatment, or the like.

Color coordinate values L, a, and b in a UCS color space in this invention are values based on coordinates grasped as a three-dimensional color solid as illustrated in FIG. 4 and are determined by a known photoelectric colorimeter (a photoelectric tube in which a photoelectric cell is used for a photodetector) for determining a color difference. As a color difference meter, that which is called "Color and Color-Difference Meter" by Richard S. Hunter and the like can be cited.

In the above coordinate values, L is a luminance divided into 0 to 100, and when L, a, and b are represented by tristimulus values X, Y, and Z in a CIE standard colorimetric system, $L=100Y^{1/2}$, $a=175(1.02X-Y)Y^{-1/2}$, $b=70(Y-0.847Z)Y^{-1/2}$. Note that in general, tristimulus values of light are determined by spectrophotometry and it is determined by International Commission on Illumination to use signs X, Y, and Z for tristimulus values.

EXAMPLES

A polarizing film used in the examples below was prepared as described below.
<Preparation of Polarizing Film>

A polyvinyl alcohol film (commonly referred to as vinylon film) having a thickness of 75 μm was uniaxially stretched at a ratio of about four times, thereafter dipped in an aqueous solution (dye solution) containing 0.1% by mass of iodine, then dipped in an aqueous solution containing 3% by weight of boric acid and drained off, and then subjected to heating treatment at 70° C. for five minutes to manufacture a plurality of polarizing films (thickness of 30 μm).

The obtained polarizing films were pressed against a spherical glass to be formed to have a spherical surface, applied with a urethane adhesive (POLYNATE 1000 produced by TOYOPOLYMER CO., LTD.) on both surfaces thereof, and was dried.

Example 1

To 100 parts by weight of CR39 (diethylene glycol his allyl carbonate) which is a liquid monomer, 3 parts of t-butyl peroxybenzoate as a polymerization initiator was added, 0.1 part of a near infrared ray absorber (manufactured by Yamada Chemical Co., Ltd.: FDN-002, maximum absorption wavelength of 807 nm) was added, further 1.0 part by weight of acetone (solvent) was compounded, and these were mixed and stirred so that a lens material composition was prepared.

Then, at the middle of an inner peripheral surface of a gasket having a ring shape made of a silicone resin, a periphery of the polarizing film as prepared in advance was held to be set, to both end surfaces of this gasket, a pair of glass molds for spectacle lens molding were liquid-tightly mounted, into a cavity which is a gap between the polarizing film and the glass molds, the lens material composition as described above was injected, in which a temperature was slowly increased from a normal temperature and a curing temperature was held at 100° C. while the temperature was slowly decreased, heating and decreasing the temperature were performed for 48 hours during the whole process, and then taken out from the molds so that a polarizing lens for spectacles was obtained.
<Measurement Test of Spectral Transmittance>

Figure 1:
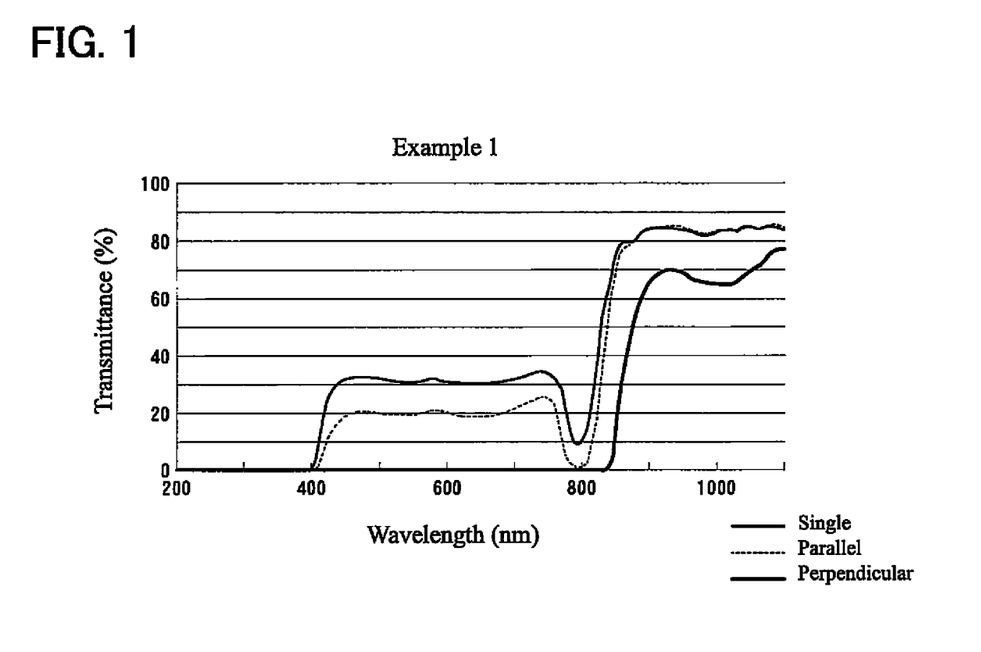
FIG. 1 is a graph indicating an optical spectrum of transmitted light of Example 1 and a relationship between a wavelength and a transmittance.

With respect to the obtained polarizing lens for spectacles, a spectral transmittance was measured by U-2000 spectrophotometer manufactured by Hitachi Ltd., and with respect to a wavelength of 200 to 1100 nm, a relationship between a wavelength and a transmittance was indicated in FIG. 1.

This measurement was performed with respect to each of a state of one obtained polarizing lens for spectacles, a state of a so-called "parallel Nicols" in which the two polarizing lenses for spectacles are superposed one upon the other and polarization axes are parallel to each other, and a state of the so-called "crossed Nicols" in which the two polarizing lenses are superposed one upon the other and polarization axes are perpendicular to each other, and results thereof were also indicated in FIG. 1.

As apparent also from the results indicated in FIG. 1, the obtained polarizing lens for spectacles was a polarizing lens having an average light transmittance of light having a wavelength of 400 to 760 nm in a visible region of 30% or more, a light transmittance of light having a wavelength of 700 to 800 nm in a near infrared region of 0% if two of the polarizing lenses were superposed one upon the other with polarization axes perpendicular to each other, which provided the polarizing lens which was a lens having a high transmittance and free from the "red leakage phenomenon".

Example 2

With a prepolymer in which polyisocyanate and a polyhydroxy compound were reacted with each other as a main component, to 100 parts by mass of a polyurethane resin material which contains aromatic polyamine (MOCA) as a curing agent, 0.1 part by mass of a near infrared ray absorber (manufactured by Yamamoto Chemicals Inc.: a phthalocyanine compound YKR-2900, maximum absorption wavelength of 780 to 790 nm) was added, and these were mixed and stirred so that a lens material composition was prepared.

Then, similarly to Example 1, the iodine-containing polarizing film as prepared in advance was set at the inner side center of a gasket, the gasket was set in glass molds having a convex surface and a concave surface, and into a gap between the polarizing film and the glass molds, the lens material composition as vacuum degassed was injected.

The molding material was heated so that a temperature gradually increases from a normal temperature, cured at 120° C. for four hours, cooled and taken out from the molds, and annealed at 100° C. for two hours so that a polarizing spectacle lens was obtained.

Similarly to that as described above, the optical spectrum was measured and the relationship between the wavelength and the transmittance was examined, which was substantially similar to the results of Example 1 (FIG. 1), the average light transmittance of light having a wavelength of 400 to 760 nm in a visible region was 33%, the light transmittance of light having a wavelength range of 700 to 800 nm in a near infrared region was 0% if two of the polarizing lenses were superposed one upon the other with polarization axes perpendicular to each other, which provided the polarizing lens which was a grey-like color lens having a high transmittance and free from the "red leakage phenomenon".

Example 3

To 100 parts by mass of a mixture of a raw material liquid A and liquid B of a high refractive index resin in which isocyanate and polythiol were mixed with each other (manufactured by Mitsui Chemicals Inc.: thiourethane-containing resin MR-7, refractive index of 1.67), 0.1 part of a near infrared ray absorber (manufactured by Yamada Chemical Co., Ltd.: FDN-002, maximum absorption wavelength of 807 nm) was added, and these were mixed and stirred so that a lens material composition was prepared.

Then, similarly to Example 1, the iodine-containing polarizing film as prepared in advance was set at the inner side center of a gasket, the gasket was set in glass molds having a convex surface and a concave surface, and into a gap between the polarizing film and the glass molds, the lens material composition as vacuum degassed was injected.

The molding material was heated so that a temperature gradually increased from a normal temperature, cured at 120° C. for four hours, cooled and taken out from the molds, and annealed at 100° C. for two hours so that a grey-like color lens was obtained.

Similarly to that as described above, the optical spectrum was measured and the relationship between the wavelength and the transmittance was examined, which was similar to the results of Example 1 (FIG. 1), the average light transmittance of light having a wavelength of 400 to 760 nm in a visible region was 33%, the light transmittance of light having a wavelength range of 700 to 800 nm in a near infrared region was 0% if two of the polarizing lenses were superposed one upon the other with polarization axes perpendicular to each other, which provided the polarizing lens which was a grey-like color lens having a high transmittance and free from the "red leakage phenomenon".

Example 4

With a prepolymer in which polyisocyanate and a polyhydroxy compound were reacted with each other as a main component, to 100 parts by mass of a polyurethane resin material which contains aromatic polyamine (MOCA) as a curing agent, 0.1 part of a near infrared ray absorber (manufactured by Yamada Chemical Co., Ltd.: FDN-002, maximum absorption wavelength of 807 nm) was added, while 0.01 part by mass of a blue light absorber manufactured by Yamada Chemical Co., Ltd.: YP-1 was added, and these were mixed and stirred so that a lens material composition was prepared.

Then, similarly to Example 1, the iodine-containing polarizing film as prepared in advance was set at the inner side center of a gasket, the gasket was set in glass molds having a convex surface and a concave surface, and into a gap between the polarizing film and the glass molds, the lens material composition as vacuum degassed was injected.

The molding material was heated so that a temperature gradually increased from a normal temperature, cured at 120° C. for four hours, cooled and taken out from the molds, and annealed at 100° C. for two hours so that a polarizing spectacle lens was obtained.

Figure 2:
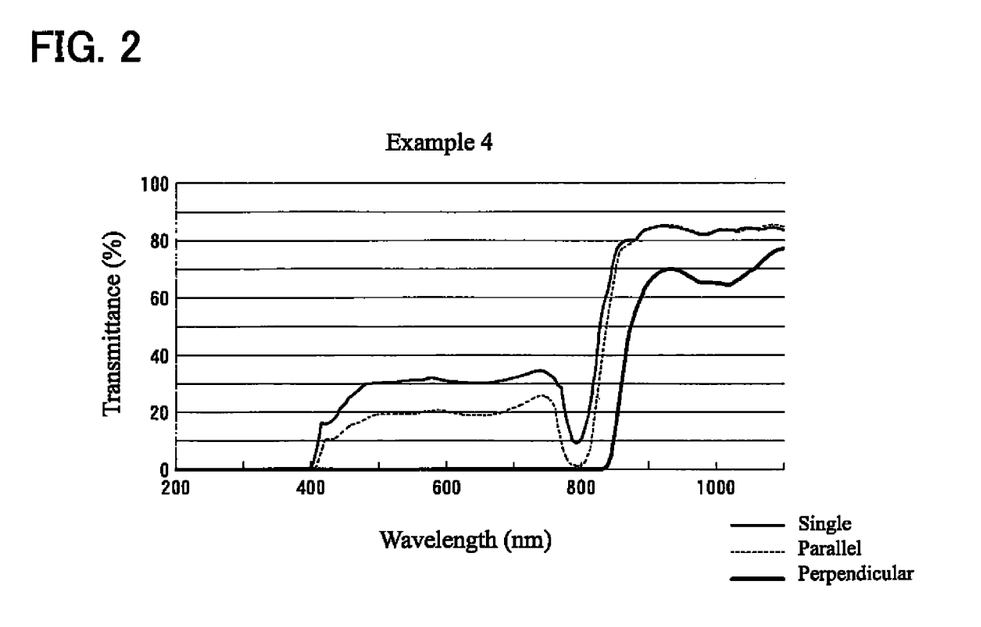
FIG. 2 is a graph indicating an optical spectrum of transmitted light of Example 4 and a relationship between a wavelength and a transmittance.

Similarly to that as described above, the optical spectrum was measured and the relationship between the wavelength and the transmittance is indicated in FIG. 2. As apparent also from the results as indicated in the graph, the average light transmittance of light having a wavelength of 400 to 760 nm in the visible region was 33%, the light transmittance in the wavelength of 400 to 500 nm in the blue light region was 0.09% if two of the polarizing lenses are superposed one upon the other with polarization axes thereof perpendicular to each other, and the light transmittance of light having a wavelength range of 700 to 800 nm in a near infrared region was 0% if similarly, two of the polarizing lenses were superposed one upon the other with polarization axes thereof perpendicular to each other, which provided the polarizing lens which was a grey-like color lens having a high transmittance and free from either of the "red leakage phenomenon" and the "blue leakage phenomenon".

Example 5

To 100 parts by weight of CR39 (diethylene glycol bis allyl carbonate) which is a liquid monomer, 3 parts of t-butyl peroxybenzoate as a polymerization initiator was added, further 1.0 part by weight of acetone (solvent) was compounded, and these were mixed and stirred so that a lens material composition containing a normal CR39 to which no dye was added was prepared.

Then, at the middle of an inner peripheral surface of a gasket having a ring shape made of a silicone resin, a periphery of the polarizing film as prepared in advance was held to be set, to both end surfaces of this gasket, a pair of glass molds for spectacle lens molding were liquid-tightly mounted, into a cavity which is a gap between the polarizing film and the glass molds, the lens material composition as described above was injected, in which a temperature was slowly increased from a normal temperature and a curing temperature was held at 100° C. while the temperature was slowly decreased, heating and decreasing the temperature were performed for 48 hours during the whole process, and then taken out from the molds so that a polarizing lens for spectacles was obtained.

On a concave surface side of this normal CR polarizing lens, a coating manufactured by dissolving 0.1 part of a near infrared ray absorber (manufactured by Yamada Chemical Co., Ltd.: FDN-002, maximum absorption wavelength of 807 nm) to a lacquer was applied by spin coating and dried so that a film was formed.

The optical spectrum of the polarizing lens as thus obtained was measured and the relationship between the wavelength and the transmittance was examined, which was substantially similar to the results of Example 1 (FIG. 1), the average light transmittance of light having a wavelength of 400 to 760 nm in the visible region was 33%, the light transmittance of light having a wavelength range of 700 to 800 nm in the near infrared region was 0% if two of the polarizing lenses were superposed one upon the other with polarization axes thereof perpendicular to each other, which provided the polarizing lens for spectacles which was a grey-like color lens having a high transmittance and free from the "red leakage phenomenon".

Comparative Example 1

A polarizing film was manufactured using iodine and common dyes as a dichroic dye as described below. That is, a polyvinyl alcohol film (commonly referred to as vinylon film) having a thickness of 75 μm was uniaxially stretched at a ratio of about four times, thereafter dipped in an aqueous solution (dye solution) containing 0.1% by weight of iodine, 0.04% by weight of Direct Fast Orange and 0.02% by weight of Sirius Scarlet B which are direct dyes, 0.01% by weight of Mikacion Yellow RS and 0.012% by weight of Diamira Red B which are reactive dyes then dipped in an aqueous solution containing 3% by mass of boric acid and drained off, and then subjected to heating treatment at 70° C. for five minutes to manufacture a plurality of polarizing films (thickness of 30 μm).

Color coordinate values L, a, and b in a UCS color space of the obtained polarizing film (one piece) were measured by a device in which Σ90 color measuring system and Z-II optical sensor manufactured by Nippon Denshoku Industries Co., Ltd. were combined with each other so that in the coordinate values L, a, and b, L=54.81, a=−0.56, and b=−0.23, which fell within a predetermined range of a grey-like color expressed by 22≤L≤70, −2.0≤a≤2.0, and −2.0≤b≤2.0, respectively.

Except that this polarizing film was used, a polarizing spectacle lens was manufactured completely similarly to Example 1.

Figure 3:
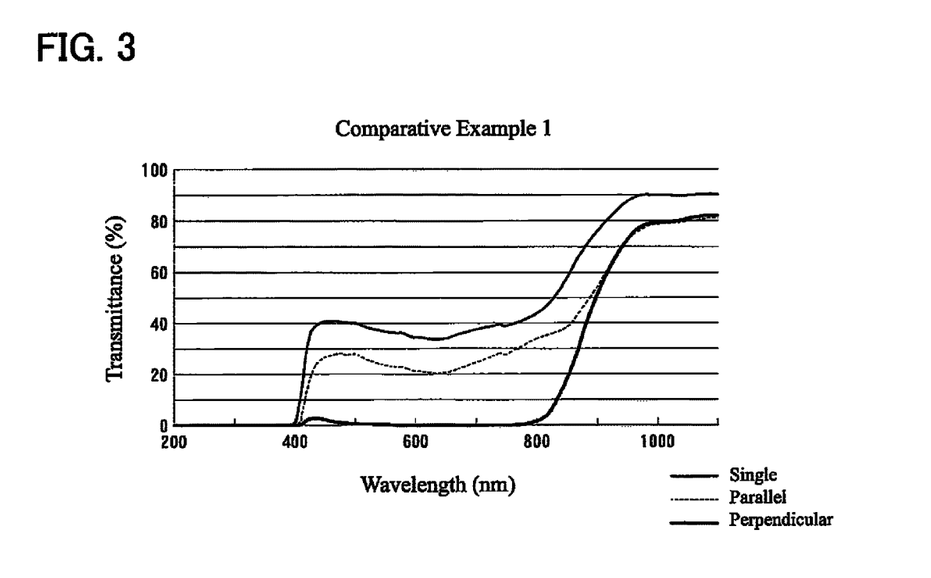
FIG. 3 is a graph indicating an optical spectrum of transmitted light of Comparative Example 1 and a relationship between a wavelength and a transmittance.

Similarly to Example 1, the optical spectrum of the obtained polarizing spectacle lens was measured, the relationship between the wavelength and the transmittance was examined and results were indicated in FIG. 3. As apparent also from the results of the wavelength and the transmittance as indicated in the graph, the average light transmittance of light having a wavelength of 400 to 760 nm in the visible region was 38%, the light transmittance of light having a wavelength range of 700 to 800 nm in the near infrared region was 2.8% (800 nm) if two of the polarizing lenses were superposed one upon the other with polarization axes thereof perpendicular to each other, a "red leakage phenomenon" occurred, and the light transmittance of light having a wavelength of 400 to 500 nm in the blue light region was 3.2% (430 nm) so that a "blue leakage phenomenon" also occurred.

Note that for reference, to allow a cross transmittance in a wavelength range of 380 nm to 800 nm to be 0%, it was necessary to add a dye to a lens material to darken the transmittance to 12%.

Comparative Example 2

In Comparative Example 1, for the purpose of preventing a blue leakage, to 100 parts by mass of a lens material, 0.005 parts by mass of a yellow-like dye (manufactured by BASF: Orasol Yellow 2GLN) was added, and a color of a spectacle lens was deepened in yellow and red so that a blueish polarizing spectacle lens having a grey-like color was manufactured.

The optical spectrum of the polarizing lens as thus obtained was measured and the relationship between the wavelength and the transmittance was examined, which was similar to the results of Comparative Example 1 as shown in FIG. 3, the average light transmittance of light having a wavelength of 400 to 760 nm in the visible region was 30% or more, but a light transmittance of light having a wavelength of 400 to 500 nm in the blue light region was substantially 3% if two of the polarizing lenses were superposed one upon the other with polarization axes thereof perpendicular to each other, which failed to prevent a "blue leakage phenomenon" and failed to obtain an expected no-blueish grey color.

Thus, it was attempted to obtain a (grey-like color) polarizing lens for spectacles having a high transmittance and allowing no "blue leakage phenomenon" to occur, but if the light transmittance of light having a wavelength range of 400 to 500 nm was attempted to come close to 0%, a desired grey color failed to be obtained.

The invention claimed is:

1. A polarizing lens for spectacles comprising:
a lens base material; and
a polarizing element superposed upon the lens base material, wherein the polarizing element has an average light transmittance of light having a wavelength of 400 to 760 nm in a visible region, the average light transmittance being 30% or more,
wherein a light transmittance of light having a wavelength of 410 to 700 nm in a near infrared region is 0 to 2% when the polarizing element and an identical polarizing element are superposed one upon the other with polarization axes thereof perpendicular to each other,
wherein one of a film integral with the polarizing lens and the lens base material contains a near infrared ray absorption dye such that a light transmittance of light having a wavelength of 700 to 800 nm in a near infrared region is 0 to 2% when the polarizing lens and an identical polarizing lens are superposed one upon the other with polarization axes thereof perpendicular to each other,
wherein the polarizing element is an iodine-containing polarizing element, and
wherein the polarizing lens further contains a blue light absorber having a maximum absorption wavelength of 450 to 550 nm such that a light transmittance of light having a wavelength of 400 to 500 nm in a blue light region is 0 to 2% when the polarizing lens and the identical polarizing lens are superposed one upon the other with polarization axes thereof perpendicular to each other, the blue light absorber comprising an ultraviolet ray absorber compounded with a yellow or orange dye.

2. The polarizing lens according to claim 1, wherein the lens base material is made of a resin for cast molding selected from an allyl diglycol carbonate resin, a urethane resin, a thiourethane resin, and an acrylic resin.

3. The polarizing lens according to claim 1, wherein the lens base material is dyed to have a grey-like color in which color coordinate values L, a, and b in a UCS color space are expressed by $22 \leq L \leq 70$, $-2.0 \leq a \leq 2.0$, and $-2.0 \leq b \leq 2.0$, respectively.

4. The polarizing lens according to claim 2, wherein the lens base material is dyed to have a grey-like color in which color coordinate values L, a, and b in a UCS color space are expressed by $22 \leq L \leq 70$, $-2.0 \leq a \leq 2.0$, and $-2.0 \leq b \leq 2.0$, respectively.

* * * * *